Patented July 6, 1926.

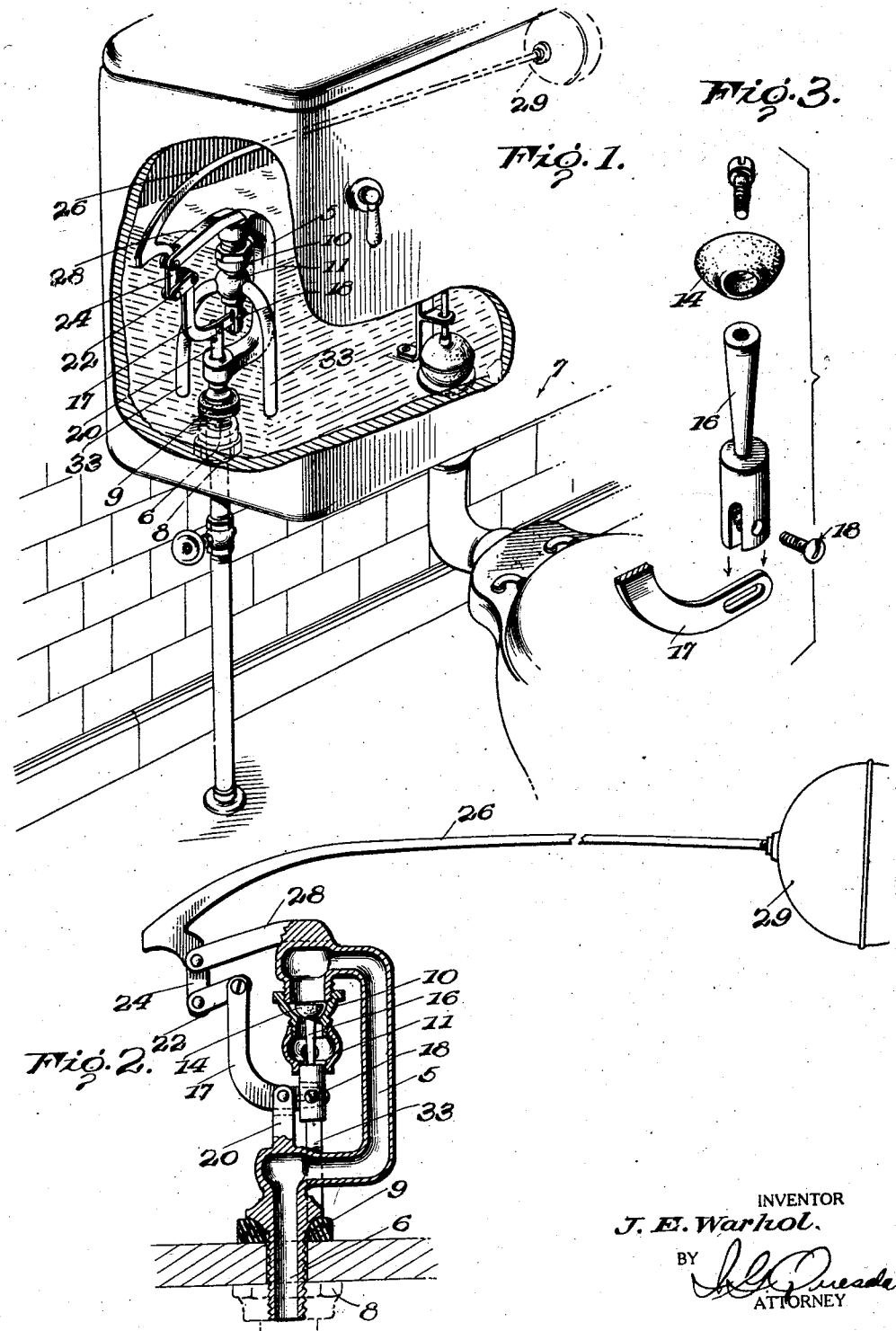

1,591,150

UNITED STATES PATENT OFFICE.

JOSEPH E. WARHOL, OF WACO, TEXAS.

FLOAT-OPERATED VALVE.

Application filed February 16, 1926. Serial No. 88,660.

This invention relates to valves of the float-operated type and is especially adapted for use in flush tanks and the like.

Briefly stated, an important object of this invention is to provide a float operated valve construction in which the valve is at the pressure side of the valve seat so that the pressure of the water is effectively employed to hold the valve firmly seated and thereby avoid leaks and the necessity of frequent repair.

A further aim is to provide a float operated valve which is quiet in use, positive in operation against substantial water pressures, and one in which the parts may readily be replaced in a highly convenient and expeditious manner.

A further object is to provide a valve of the character specified which is of highly simplified construction, durable in use and which may be installed without a substantial departure from established practices.

Other objects and advantages will be apparent during the course of the following description.

In the accompanying drawing forming a part of this application and in which like numerals are employed to designate like parts throughout the same, Figure 1 is a perspective of the improved valve installed;

Figure 2 is a vertical sectional view through the valve;

Figure 3 is a group perspective of the valve.

In the drawing wherein for the purpose of illustration is shown a preferred embodiment of the invention, the numeral 5 designates a substantially U-shaped water inlet member, the lower horizontal branch of which has connection with a combined water conductor and connector 6. The member 6 extends through the bottom of a tank 7 and is firmly held in place by fastening means 8. Suitable gaskets 9 may be employed to establish a water tight connection between the member 6 and the bottom of the tank.

The upper horizontal branch of the U-shaped inlet member 5 has an exteriorly threaded depending terminal portion to which a valve cage or casing 10 is threaded and an outlet casing 11 is in turn threaded to the lower portion of the casing 10.

In carrying out the invention, the intermediate portion of the valve casing 10 is provided with a seat for engagement on its upper side by a valve 14 of hard rubber or other material found suitable for the purpose. It will be seen by reference to Figure 2 that the valve 10 is at the pressure side of the seat and is provided with a substantially flat top so that the pressure of the water is utilized to urge the valve to seated position. More specifically, the entire rear side of the valve is exposed to the pressure of the water.

Figure 3 illustrates that the valve 14 is provided with a stem 16 having a tapered upper portion and a lower portion having its end transversely slotted for the reception of the lower portion of an operating lever 17. A pin 18 extends through the slotted lower portion of the stem 16 and through a slot in the lever to hold the lever in proper engagement with the stem. However, the provision of the slot in the lever 17 allows the lever to partake of the necessary limited movement with respect to the valve stem.

The lever 17 is fulcrumed adjacent its stem engaging end to the upper portion of a bracket or standard 20, the standard being mounted upon and cast integral with the lower portion of the U-shaped member 5. The upper portion of the lever 17 is pivoted to a link 22 and the link is in turn connected to a short depending arm 24 of a float lever 26. Figure 2 plainly illustrates that the lever 26 is fulcrumed to a bracket 28 projecting horizontally from the upper portion of the U-shaped water inlet member 5.

Figure 1 probably best illustrates that the second lever 26 is extended across the top of the valve casing and water inlet member and is provided at the outer terminal thereof with a float 29 which rises and falls with the level of the water in the tank.

In the operation of the improved valve water is supplied through the member 5 and the valve casing 10 and is discharged out through the curved discharge pipes 33, the terminals of which may be within a quarter of an inch of the bottom of the tank so that they will be submerged during the early filling of the tank. This feature avoids noise.

The compound leverage arrangement provides for the positive opening of the valve against water pressures up to a hundred pounds and by the lever arrangement illustrated thumping of the valve is avoided. By increasing the weight of the ball 29 the valve may be made to operate in connection with water pressures above one hundred pounds.

It is to be understood that the form of invention herewith shown and described is to be taken merely as a preferred example of the same and that such minor changes in arrangement and construction of parts may be made as will remain within the spirit of the invention and the scope of what is claimed.

Having thus described the invention, what is claimed is:

1. In a float operated structure of the character specified, the combination of a U-shaped water inlet member having a lower portion and an upper portion with a threaded depending terminal portion, a valve casing having connection with said terminal portion and provided with a valve seat, a valve for engagement with the upper side of said seat, an outlet member connected to said valve casing and having downwardly extending outlet branches adapted to terminate close to the bottom of a tank, a stem extending through said outlet member and connected to the valve, a lever having connection with said stem, a standard mounted on the lower portion of said U-shaped member and supporting said lever, a link connected to said lever, a second lever having a short arm connected to said link, the upper portion of said water inlet U-shaped member being provided with a horizontally extending bracket pivotally supporting said second lever, and a ball float connected to said second lever, the action of said first and second named levers being compounded to assure the positive operation of said valve against the pressure of water.

2. In a structure of the character specified, the combination of a U-shaped water inlet member having upper and lower horizontal branches, the upper branch being provided with a bracket and with a depending terminal portion, a valve casing connected to said depending terminal portion and having a valve seat directly in the path of travel of the water, an outlet member connected to said casing and having water outlets, a valve at the pressure side of said seat and having a stem guided by said outlet member, a second bracket connected to the lower branch of said water inlet, and levers fulcrumed to said first and second named brackets and being connected to each other, one of said levers having connection with said stem and the other being provided with a float.

In testimony whereof I affix my signature.

JOSEPH E. WARHOL.